(12) United States Patent
Sprenger et al.

(10) Patent No.: US 10,500,986 B2
(45) Date of Patent: Dec. 10, 2019

(54) ACTUATING MECHANISM FOR A LONGITUDINAL ADJUSTER OF A VEHICLE SEAT, AND LONGITUDINAL ADJUSTER WITH SUCH AN ACTUATING MECHANISM

(71) Applicant: Adient Luxembourg Holding S.à.r.l., Luxembourg (LU)

(72) Inventors: Erik Sprenger, Wermelskirchen (DE); Maros Rovny, Trencin (SK); Martin Kuzma, Trencin (SK); Michael Zacharias, Leichlingen (DE)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 0 days.

(21) Appl. No.: 15/748,853

(22) PCT Filed: Jul. 5, 2016

(86) PCT No.: PCT/EP2016/065774
§ 371 (c)(1),
(2) Date: Jan. 30, 2018

(87) PCT Pub. No.: WO2017/021082
PCT Pub. Date: Feb. 9, 2017

(65) Prior Publication Data
US 2018/0222355 A1     Aug. 9, 2018

(30) Foreign Application Priority Data

Jul. 31, 2015   (DE) ........................ 10 2015 214 578
Oct. 19, 2015   (DE) ........................ 10 2015 220 262

(51) Int. Cl.
*B60N 2/08*     (2006.01)
*B60N 2/07*     (2006.01)

(52) U.S. Cl.
CPC ......... *B60N 2/0881* (2013.01); *B60N 2/0705* (2013.01); *B60N 2/0715* (2013.01);
(Continued)

(58) Field of Classification Search
CPC .. B60N 2/0881; B60N 2/0705; B60N 2/0715; B60N 2/0818; B60N 2/0875; B60N 2205/20
See application file for complete search history.

(56) References Cited

U.S. PATENT DOCUMENTS 6,161,892 A     12/2000   Chabanne et al.
7,293,752 B2 *  11/2007   McCulloch .......... B60N 2/0705
                                                       248/424
(Continued)

FOREIGN PATENT DOCUMENTS

CN     102227334 A     10/2011
CN     102673436 A     9/2012
(Continued)

*Primary Examiner* — Philip F Gabler
(74) *Attorney, Agent, or Firm* — McGlew and Tuttle, P.C.

(57) ABSTRACT

An actuating mechanism (4), for a longitudinal adjuster (1) of a vehicle seat, includes an upper rail (2.1) and a lower rail (2.2), which rails are lockable to each other by at least one lock (3). The actuating mechanism (4) includes an actuating arm (4.1), a release lever (5), a positioning element (5.2), which is arranged on the release lever (5) and is mounted pivotably at a free lever end (5.3) of the release lever (5), and a connecting region (5.1) which is arranged on the release lever (5) and has an opening (5.4) provided for the non-rotatable fastening of the actuating arm (4.1). The free lever end (5.3) is configured for arrangement in an interior space (I) of the rails (2.1, 2.2). The connecting region (5.1) is configured so as to be able to pass through an upper side of the upper rail (2.1).

20 Claims, 17 Drawing Sheets

(52) U.S. Cl.
CPC ......... *B60N 2/0818* (2013.01); *B60N 2/0875* (2013.01); *B60N 2205/20* (2013.01)

(56) References Cited

U.S. PATENT DOCUMENTS

| | | | | |
|---|---|---|---|---|
| 8,049,491 | B2* | 11/2011 | Nishide | B60N 2/06 |
| | | | | 324/207.22 |
| 8,464,993 | B2* | 6/2013 | Muraishi | B60N 2/067 |
| | | | | 248/424 |
| 9,120,400 | B2* | 9/2015 | Ruthmann | B60N 2/0705 |
| 9,242,580 | B2* | 1/2016 | Schebaum | B60N 2/0843 |
| 9,764,660 | B2* | 9/2017 | Takiya | B60N 2/075 |
| 10,086,721 | B2* | 10/2018 | Arakawa | B60N 2/0705 |
| 2008/0251679 | A1* | 10/2008 | Stoia | B60N 2/0881 |
| | | | | 248/429 |
| 2013/0264453 | A1* | 10/2013 | Dill | B60N 2/0705 |
| | | | | 248/429 |
| 2018/0222355 | A1* | 8/2018 | Sprenger | B60N 2/0705 |
| 2018/0229626 | A1* | 8/2018 | Sprenger | B60N 2/0818 |

FOREIGN PATENT DOCUMENTS

| | | |
|---|---|---|
| DE | 100 45 386 A1 | 4/2002 |
| DE | 10 2004 056 430 B3 | 9/2005 |
| DE | 10 2006 021 884 B3 | 10/2007 |
| DE | 10 2008 058 518 A1 | 5/2010 |
| DE | 10 2010 049 543 A1 | 4/2012 |
| EP | 0976605 A1 | 2/2000 |
| FR | 2 893 277 A1 | 5/2007 |
| JP | 2004 276670 A | 10/2004 |
| JP | 4 234 470 B2 | 3/2009 |

* cited by examiner

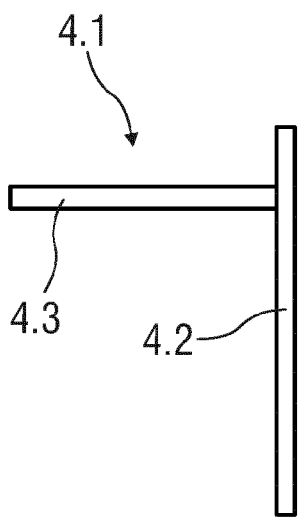
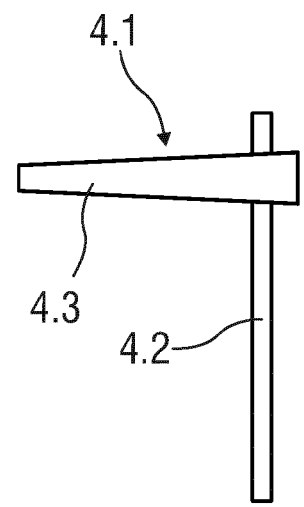
FIG 3A          FIG 3B
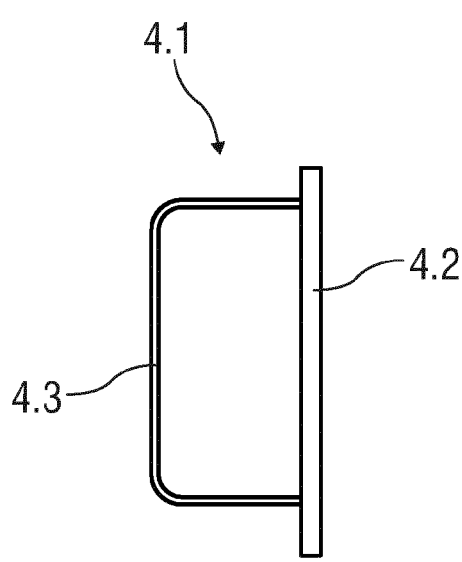
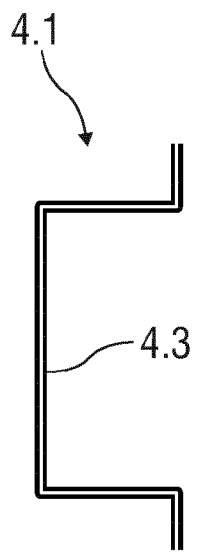
FIG 3C          FIG 3D

ACTUATING MECHANISM FOR A LONGITUDINAL ADJUSTER OF A VEHICLE SEAT, AND LONGITUDINAL ADJUSTER WITH SUCH AN ACTUATING MECHANISM

CROSS REFERENCE TO RELATED APPLICATIONS

This application is a United States National Phase Application of International Application PCT/EP2016/065774, filed Jul. 5, 2016, and claims the benefit of priority under 35 U.S.C. § 119 of German Applications 10 2015 214 578.6 filed Jul. 31, 2015, and 10 2015 220 262.3, filed Oct. 19, 2015, the entire contents of which are incorporated herein by reference.

FIELD OF THE INVENTION

The invention relates to an actuating mechanism for a longitudinal adjuster, to a longitudinal adjuster for a vehicle seat and to a vehicle seat with such a longitudinal adjuster.

BACKGROUND OF THE INVENTION

A longitudinal adjuster of the type mentioned is known, for example, from DE 10 2006 021 884 B3. In this case, a first seat rail connected to the vehicle structure and a second seat rail connected to the seat structure are provided, which seat rails mutually engage around each other and are movable relative to each other in the longitudinal direction. Also provided are a rail lock, which is arranged substantially inside the rail profile, and an unlocking flap, which is arranged outside the rail profile and acts on the rail lock when actuated. DE 10 2008 058 518 A1 discloses an actuating arrangement for a rail lock, which is inserted from outside into an opening in the seat rail via a lever.

DE 10 2010 049 543 A1 furthermore discloses a longitudinal adjuster of the type mentioned which comprises a first seat rail secured to the vehicle and a second seat rail secured to the seat, which seat rails engage around each other to form a rail profile and which seat rails are lockable by means of a rail lock, wherein the rail lock is arranged at least for the most part inside the rail profile. The longitudinal adjuster furthermore comprises an unlocking unit which is connected to an actuating arrangement via a force transmission element. Overload protection is provided between the force transmission element and the actuating arrangement.

DE 10 2004 056 430 B3 discloses a further longitudinal adjuster consisting of a lower rail secured to the vehicle and an upper rail secured to the seat. Upper rail and lower rail are securable by means of arresting means, wherein the arresting means are actuable by a rocker. The rocker is fastened pivotably to the end of a supporting arm which is operatively connected to a handle for releasing the arresting means.

SUMMARY OF THE INVENTION

It is an object of the present invention to specify an actuating mechanism for a longitudinal adjuster, which is universally usable for rail arrangements having different rail profiles. It is furthermore the object of the present invention to specify a longitudinal adjuster, which is improved with such an actuating mechanism, for a vehicle seat, and a vehicle seat with such an improved longitudinal adjuster.

The actuating mechanism according to the invention for a longitudinal adjuster of a vehicle seat comprises at least one actuating arm and a release lever, and also a positioning element which is arranged on the release lever. The positioning element is coupled here to a free lever end of the release lever, i.e. is mounted pivotably.

Furthermore, the actuating mechanism comprises a cover which couples the actuating arm to the release lever. The release lever and the cover are arranged one inside the other here. In particular, the release lever is arranged in a slot of the cover. The free lever end of the release lever projects out of the cover.

The positioning element is configured in such a manner that it acts on a rail lock, and therefore the latter is adjusted with respect to an end position, in particular to an unlocking axis of an unlocking position.

In one possible embodiment, the positioning element has contact or support surfaces which are arched, in particular support surfaces which are arched outward with respect to the arched locking elements and lead to self-centering of the unlocking stroke of the two locking elements.

In a further possible embodiment, the positioning element is configured as a two-armed lever. For extensive support of the positioning element on the element to be positioned, in the present case a rail lock, the positioning element is configured, for example, as a disk-shaped rocker. The disk-shaped rocker has a triangular shape, wherein one corner is mounted pivotably on the release lever and the two other triangle corners form the support on the rail lock. The rocker here has the form of an isosceles triangle, wherein the base of the triangle forms the support surface and the angle at the tip of the triangle is an obtuse angle, in particular an angle greater than 90°.

A development makes provision for the free lever end of the release lever to be of fork-shaped design. For uniform loading of the rail lock during unlocking, one positioning element is provided per fork end.

In one possible embodiment, the positioning element is configured as a shaped plastics part. For example, the release lever and the positioning element can be configured as what is referred to as a two-component structure, wherein the positioning element is integrally formed on the release lever, in particular is molded and insert molded thereon. The positioning element and the release lever can be formed here from different materials, for example from metal and plastic or from two different plastics materials. For example, the positioning element is made of plastic and the release lever is made of metal which is insert molded with plastic in order to form the positioning element.

In particular when the rail lock is formed from a plurality of locking elements, in particular a plurality of locking plates or pins, the plurality of locking elements are centered in at least one of their positions, in particular in the unlocking position and oriented in a plane with respect to one another and adjusted symmetrically by means of the positioning element. For example, all of the locking elements are adjusted and positioned on one and the same unlocking axis of an unlocking position and therefore into an unlocking plane by means of the positioning element.

The longitudinal adjuster according to the invention comprises at least one seat rail secured to the vehicle and one seat rail secured to the seat, which seat rails mutually engage around each other to form a rail profile and are movable relative to each other in the longitudinal direction, and are lockable to each other by means of a rail lock, and at least one actuating mechanism for actuating the rail lock, wherein at least one positioning element is provided which is configured in such a manner that it centers the rail lock with respect to an end position, in particular to an unlocking axis of an unlocking position.

In one possible embodiment, the positioning element is arranged pivotably at the end of the release lever. Furthermore, the positioning element is configured, for example, as a rocker, i.e. as a two-armed lever.

The cover has a connection region for connection of the actuating arm. The connection region protrudes, for example, perpendicularly from an upper seat rail, in particular from a slot-shaped recess in the upper seat rail. The actuating arm is fastened to said connection region, which protrudes perpendicularly from the upper seat rail, in a torque-proof manner with said connection region, and therefore pivoting of the actuating arm leads to pivoting of the connection region, as a result of which the rotation point of the actuating mechanism is formed in the connection region of the cover and of the release lever coupled thereto.

Such a longitudinal adjuster is universally usable and permits both use with internal actuation, in particular with an internally engaging actuating arm or operating lever, and also with external actuation, in particular with an externally engaging actuating arm. In this case, the actuating arm can be of single-armed design or can be configured as a yoke. In addition, a longitudinal adjuster of this configuration is suitable for rail arrangements both with a high and a low rail profile. Furthermore, such a longitudinal adjuster is independent of the type and the configuration of the rail lock and is therefore suitable for adaptation of any kind of rail lock.

One embodiment makes provision for the release lever to be arranged inside the rail profile formed by the rails and to protrude at least in sections together with the cover from the rail profile. By means of the configuration of the release lever as a force transmission element and the internal arrangement of the release lever, a compact, simple and protected arrangement is provided. In particular, the space requirement for the actuation is minimized.

In particular, the free lever end projects into an inner space of the rail profile, wherein the positioning element acts on the locking element or the locking elements in the inner space of the rail profile.

Exemplary embodiments of the invention are explained in more detail with reference to drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIGS. 3A to 3D are schematic views of various embodiments of an actuating arm;

DESCRIPTION OF THE PREFERRED EMBODIMENTS

Figure 1:
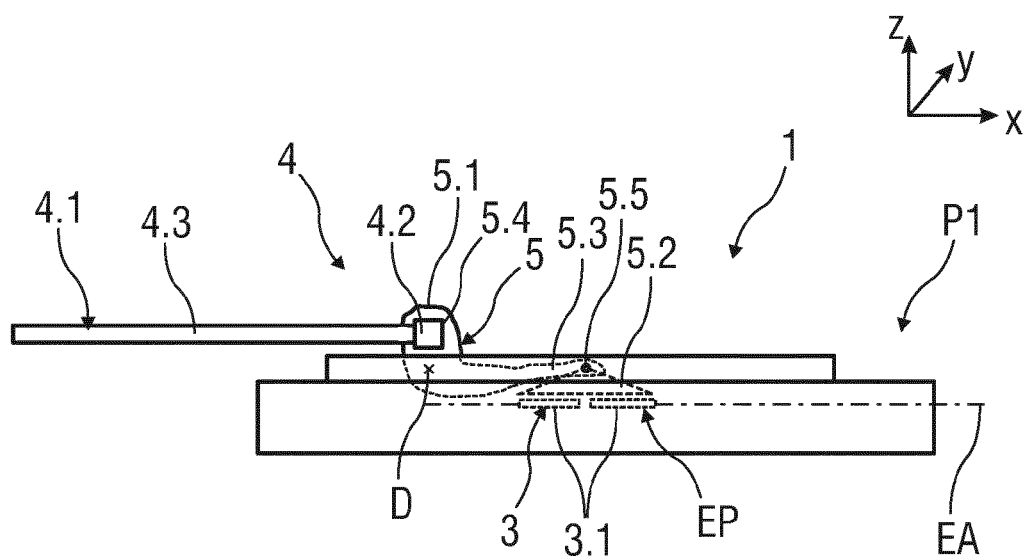
FIG. 1 is a schematic side view of an actuating mechanism.

Referring to the drawings, parts corresponding to one another are provided with the same reference signs in all of the figures.

Figure 2:
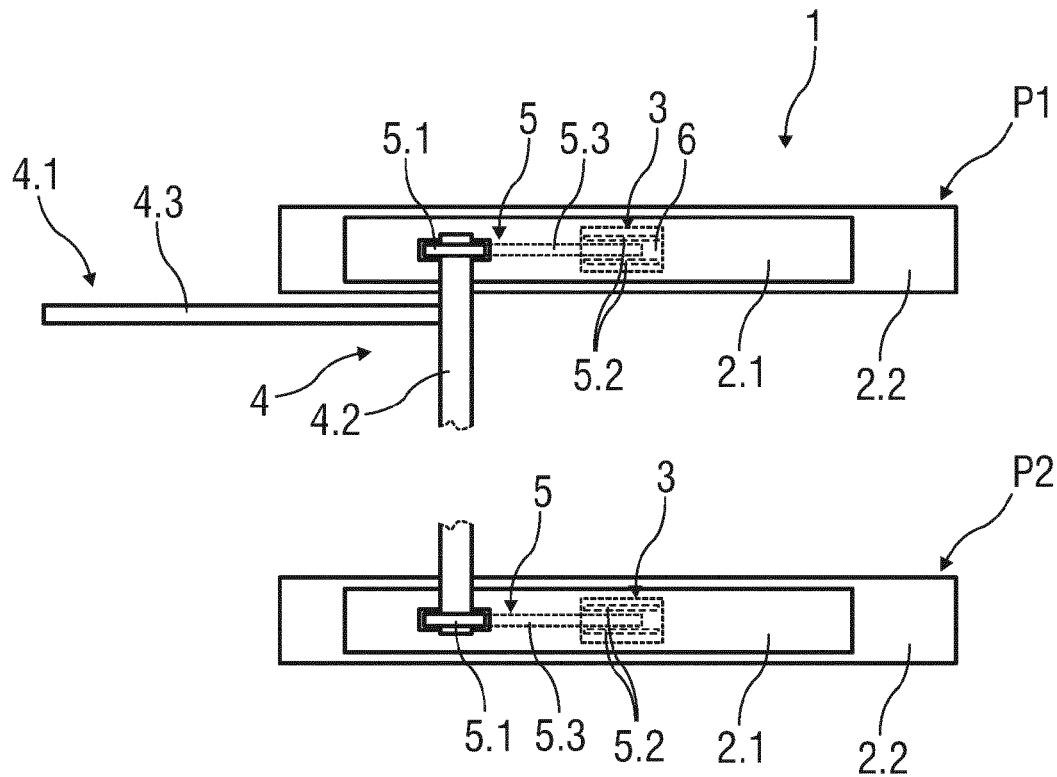
FIG. 2 is a schematic in top view of an actuating mechanism.

FIGS. 1 and 2 show schematically, in a side view and top view, a longitudinal adjuster 1 for a vehicle seat. The longitudinal adjuster 1 serves for the manual longitudinal adjustment, i.e. the adjustment of a seat longitudinal position, of a vehicle seat (not illustrated specifically). On each side of the vehicle seat, the longitudinal adjuster 1 is provided with a rail system 2, comprising two rail pairs P1, P2 each having two rails 2.1, 2.2.

In this case, one of the rails 2.2 of one of the rail pairs P1, P2 is in each case configured to be secured to the vehicle and is connected to a vehicle structure, in particular to the vehicle floor. The other seat rail 2.1 is fastened in a manner secured to the vehicle seat.

Figure 4:
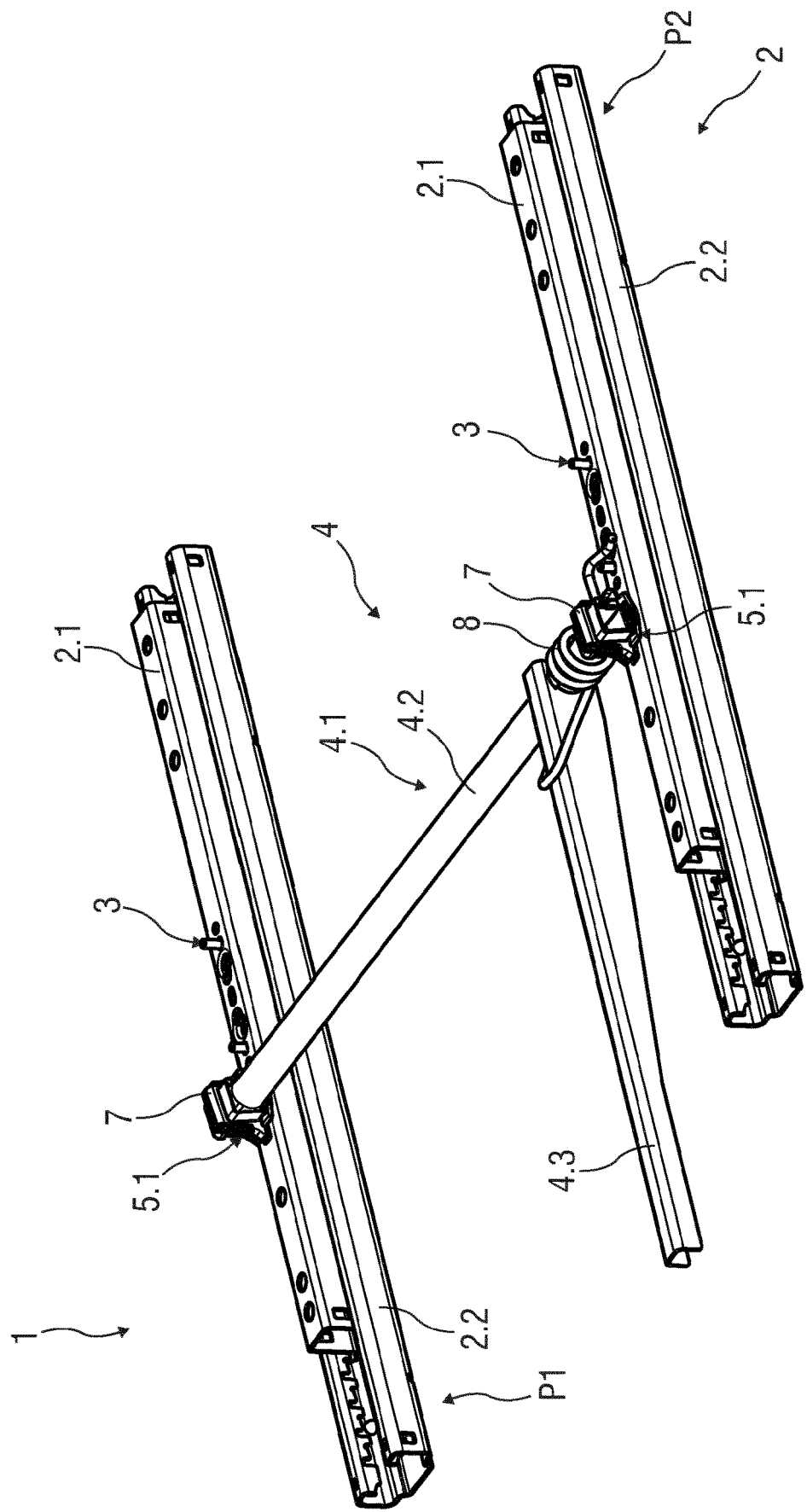
FIG. 4 is a schematic perspective illustration of a longitudinal adjuster for a rail system with a rail lock and an actuating mechanism for the rail lock.

The two rails 2.1, 2.2 mutually engage around each other to form a rail profile with an inner space I and are movable relative to each other in the longitudinal direction (as shown in FIG. 4), wherein balls (not illustrated) are arranged between the two rails 2.1, 2.2 in order to reduce the friction.

The longitudinal adjuster 1 according to the invention preferably generally has two rail pairs P1, P2, each with an upper rail and a lower rail as rails 2.1, 2.2.

The two rails 2.1, 2.2 are lockable to each other by means of a rail lock 3. The rail lock 3 is arranged in the inner space I inside the rail profile and can be configured in any desired way, for example as a latching plate or a latching lever or a latching pawl.

In the exemplary embodiment, the rail lock 3 has two locking elements 3.1 which are configured as latching plates, are arranged movably on one of the rails 2.1, 2.2, in particular on the upper seat rail 2.2, and are optionally pretensioned by means of a tension spring 3.2 and, in the locked state, engage in a locking manner in both rails 2.1, 2.2, for example in slot-shaped rail openings (not illustrated), for example by means of locking teeth 11.

Said rail lock 3 is releasable and actuable by means of an actuating mechanism 4 which is at least partially arranged outside the rails 2.1, 2.2. The actuating mechanism 4 for actuating, in particular unlocking or releasing, the rail lock 3 can be designed in various ways and comprises an actuating arm 4.1.

The actuating arm 4.1 can be configured here as a handle or as a one-armed hand grip. The actuating arm 4.1 is configured in such a manner that it protrudes at the front end of the vehicle seat and can be actuated by a user.

The actuating mechanism 4 comprises a release mechanism. The release mechanism is arranged between the actuating arm 4.1 and the rail lock 3 and couples them to each other in such a manner that, when the actuating arm 4.1 is actuated, the rail lock 3 is released and unlocked, and therefore one of the rails 2.1, 2.2 can be moved relative to the other.

The release mechanism comprises a release lever 5 with a connection region 5.1, which protrudes from the rail profile, in particular from the upper rail 2.1, for the actuating arm 4.1, and with at least one positioning element 5.2. The connection region 5.1 is configured, for example, as a retaining tab or retaining lug and protrudes from a recess 6 in the rail 2.1. The connection region 5.1 is configured in such a manner that the externally engaging actuating arm 4.1 is fixable thereon with a form-fit and/or force-fit. For example, the actuating arm 4.1 is arranged in the connection region 5.1 so as to be clippable or latchable in an opening 5.4.

The positioning element 5.2 is arranged within the rail profile on an inner lever end 5.3 of the release lever 5. The positioning element 5.2 is configured in such a manner that, when the actuating arm 4.1 is actuated, said positioning element centers the rail lock 3, in particular the two locking elements 3.1, with respect to one of their end positions, in particular to an unlocking axis EA of an unlocking position EP, that is to say adjusts and positions said rail lock symmetrically.

For this purpose, the positioning element 5.2 is coupled to the free end 5.3 of the release lever 5, said free end being directed into the rail profile. The positioning element 5.2 is in particular mounted pivotably and is configured as a rocker, that is to say as a two-armed lever. In this connection, a respective positioning arm of the positioning element 5.2 is assigned to a locking element 3.1. In the exemplary embodiment, the positioning element 5.2 is configured as a triangular plate or disk and has a central joint axis 5.5. Two of the triangle corners are assigned here to a locking element 3.1.

The disk-shaped rocker has a triangular shape. One of the triangle corners is mounted pivotably on the release lever 5. The two other triangle corners form the support on the rail lock 3. The rocker here has the shape of an isosceles triangle, wherein the base of the triangle forms the support surface and the angle at the tip of the triangle is an obtuse angle, in particular an angle of greater than 90°.

The positioning element 5.2 is formed from plastic.

The upper rail 2.1 does not have any openings in the side walls for releasing the rail lock 3. This increases the rail strength.

The connection region 5.1 and the release lever 5 are provided for coupling the actuating arm 4.1 to the rail lock 3, and therefore a conventional additional unlocking lever for the rail lock 3 can be omitted.

In order to unlock the two rail pairs P1 and P2 and for reasons of symmetry, as shown in FIG. 2, two release levers 5 are provided which are connected to each other by means of the actuating arm 4.1. The actuating arm 4.1 is provided here with a transverse rod 4.2, the ends of which are held in the openings 5.4 with a form-fit and/or force-fit. The transverse rod 4.2 here has a cross-sectional shape differing from a round cross section, at least in the region of the free ends. In particular, the transverse rod 4.2 has a profiled cross section or rectangular cross section on the end side, as a result of which an improved transmission of force and an improved fastening to the connection region 5.1 of the release lever 5 is made possible.

Such a symmetrical construction of the rail system 2 and of the actuating mechanism 4 with identical release levers 5 in the rail pairs P1, P2 leads to a reduction in the variants as a result of a plurality of identical parts and therefore to cost-effective production.

The internal release mechanism and the internal rail lock 3 minimize accidental release. In addition, a common external actuating arm 4.1 can be used for both release levers 5 and both rail locks 3.

The release lever 5 is formed in one piece from metal or plastic or as a hybrid component of metal and plastic.

The release lever 5 forms a force transmission element for transmitting and transforming the rotation of the actuating arm 4.1 into a vertical movement of the rail lock 3 for the purpose of unlocking the latter. The release lever 5 and the connection of the actuating arm 4.1 are configured in such a manner that the rotation point D of the actuating arm 4.1 is formed in the region of the upper rail 2.1. Consequently, the rotation point D of the actuating arm 4.1 is offset inward from the latter toward the release lever 5. For this purpose, the release lever 5 is mounted pivotably on the upper rail 2.1.

FIGS. 3A to 3D show schematically, in top view, various embodiments of an actuating arm 4.1 of the actuating mechanism 4 for the longitudinal adjuster 1. The actuating arm 4.1 can be configured here as an operating lever engaging externally on the release lever 5 with a transverse rod 4.2 with a welded-on hand grip 4.3 (FIG. 3A) made of metal, or a mechanically connected hand grip 4.3 (FIG. 3B) made of plastic, or a transverse rod 4.2 with a welded-on yoke as hand grip 4.3 (FIG. 3C), in particular a U-shaped yoke, or as a one-part transverse yoke as hand grip 4.3 (FIG. 3D) made of plastic or metal.

FIG. 4 shows schematically, in a perspective illustration, a longitudinal adjuster 1 for a rail system 2 with a rail lock 3 and an actuating mechanism 4 for the rail lock 3.

To avoid rattling noises and to automatically retain the actuating arm 4.1 in the passive or rest position, the latter is held with spring pretensioning on the rail system 2. For this purpose, a spring element 8, for example a yoke spring, a leg spring or a helical spring, is arranged between the actuating arm 4.1 and the upper rail 2.1 and pretensions the actuating arm 4.1 in the rest or passive position.

The respective connection region 5.1, which protrudes from the opening 5.4, of the release lever 5 is provided with a cover 7. The respective cover 7 is configured in such a manner that it holds the associated connection region 5.1 of the release lever 5 with a form-fit and/or force-fit such that the release lever 5 is held on the rail 2.1 during the installation of the transverse rod 4.2. Moreover, the respective cover 7 is configured in such a manner that it forms an end stopper for the transverse rod 4.2, and therefore said end stopper is fixed between the two rail pairs P1 and P2.

Figure 5:
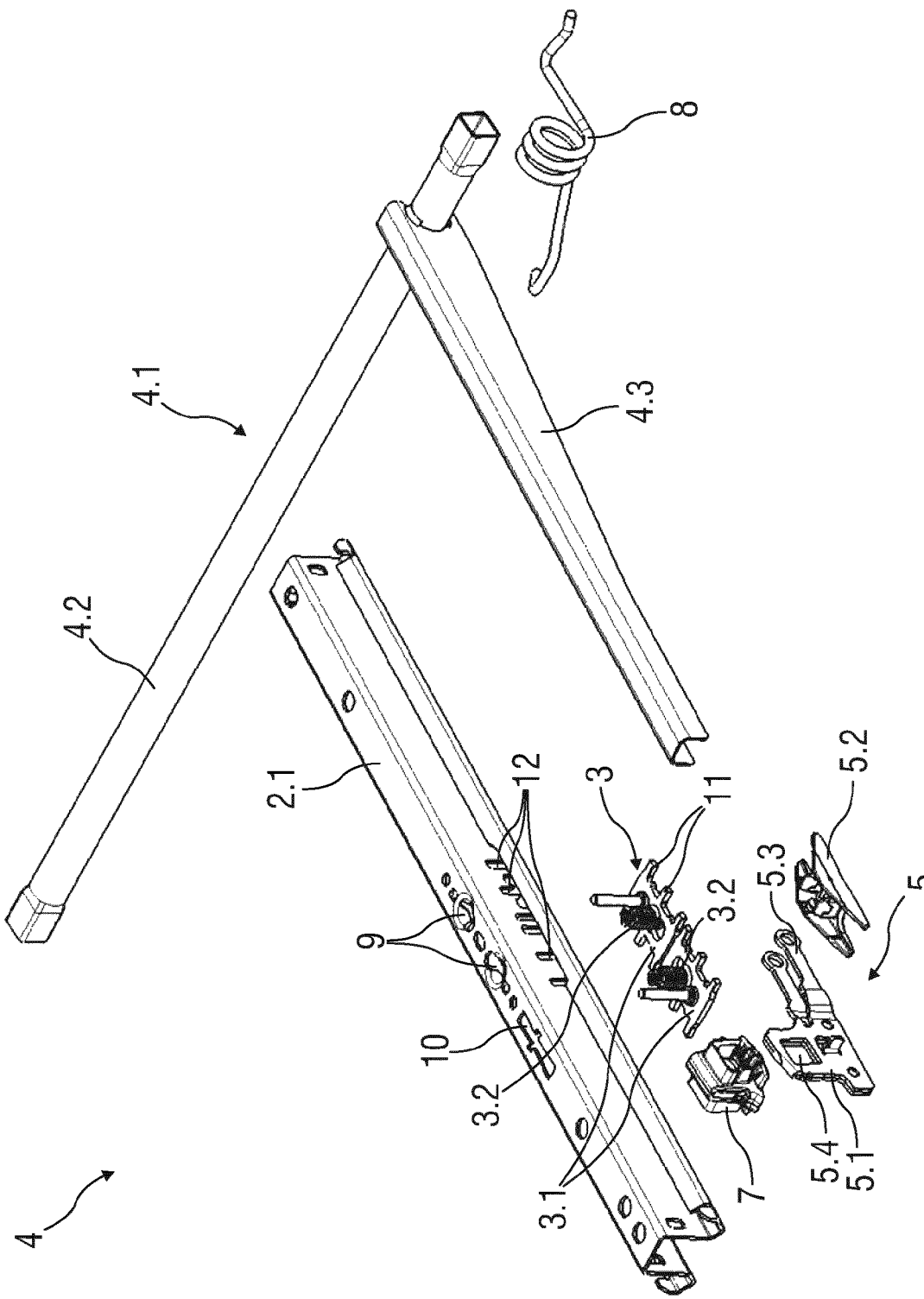
FIG. 5 is a schematic exploded illustration of the components of an actuating mechanism for a longitudinal adjuster.

FIG. 5 shows schematically, in an exploded illustration, the components of the actuating mechanism 4 for one of the rail pairs P1 or P2. The actuating mechanism 4 here comprises the common actuating arm 4.1, comprising the transverse rod 4.2 and the hand grip 4.3, and the respective upper rail 2.1 on which the release lever 5 and the rail lock 3 are in each case held. The common actuating arm 4.1 is held in a spring pretensioned manner on the upper rail 2.1 of one of the rail pairs P1 or P2 by means of the one spring element 8.

The respective release lever 5 comprises the connection region 5.1 with the opening 5.4 for receiving one of the ends of the transverse rod 4.2, and the lever end 5.3 which, for example, is of fork-shaped design, for receiving the positioning element 5.2.

The upper rail 2.1 has at least two passage openings 9 through which the rail lock 3 is guided and is fastened to the rail 2.1. Furthermore, the upper rail 2.1 has a slot opening 10 for receiving the connection region 5.1 of the release lever 5.

In the side walls, the upper rail 2.1 has locking openings 12 corresponding to locking teeth 11 of the locking elements 3.1.

Figure 6:
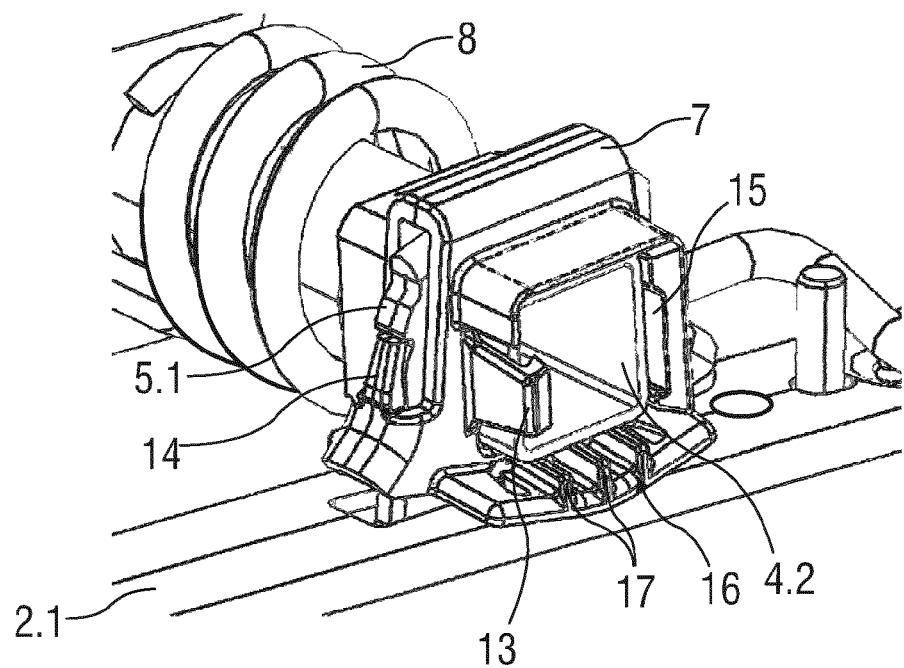
FIG. 6 is a schematic enlarged illustration of an actuating mechanism in the region of a release mechanism with a cover.
Figure 7:
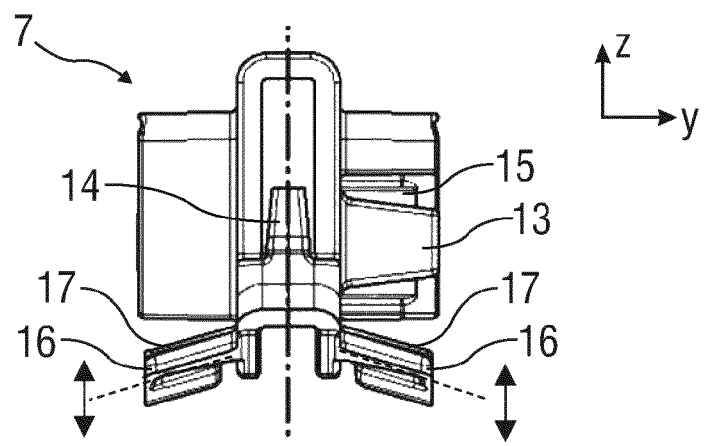
FIG. 7 is a schematic elevation view of a cover.

FIG. 6 schematically shows, in an enlarged illustration, the actuating mechanism 4 in the region of a release mechanism with the cover 7. FIG. 7 shows the cover 7 in detail.

The cover 7 has an end stopper 13 for that end of the transverse rod 4.2 which projects into the cover 7. The end stopper 13 is configured, for example, in the form of a stop surface or a protruding hook.

Moreover, the cover 7 has a holding element 14 for holding the connection region 5.1 of the release lever 5 introduced into the cover 7, in particular into a slot 7.1. The connection region 5.1 is designed in a manner corresponding to the holding element 14, and therefore they are connected releasably to each other in the assembled state, in particular are connected to each other in a latching manner. The holding element 14 is configured, for example, as a clip or latching hook.

In order to introduce the transverse rod 4.2 into the cover 7, the latter has a guide surface 15 on the inner wall.

Furthermore, the cover 7 is of flexible design in the support region 16 facing the upper rail 2.1, in order to compensate for forces acting on the upper rail 2.1 in the Z direction. For this purpose, the support region 16 is correspondingly shaped, for example is arched in the Z direction, and is shaped in an inclined manner in the Y direction and is provided with a number of supporting ribs 17. The supporting ribs 17 here can be formed from a flexible material. In particular, the cover 7 is formed from plastic. The supporting ribs 17 serve here for damping supporting of that end of the transverse rod 4.2 which projects outward from the cover 7.

Figure 8A:
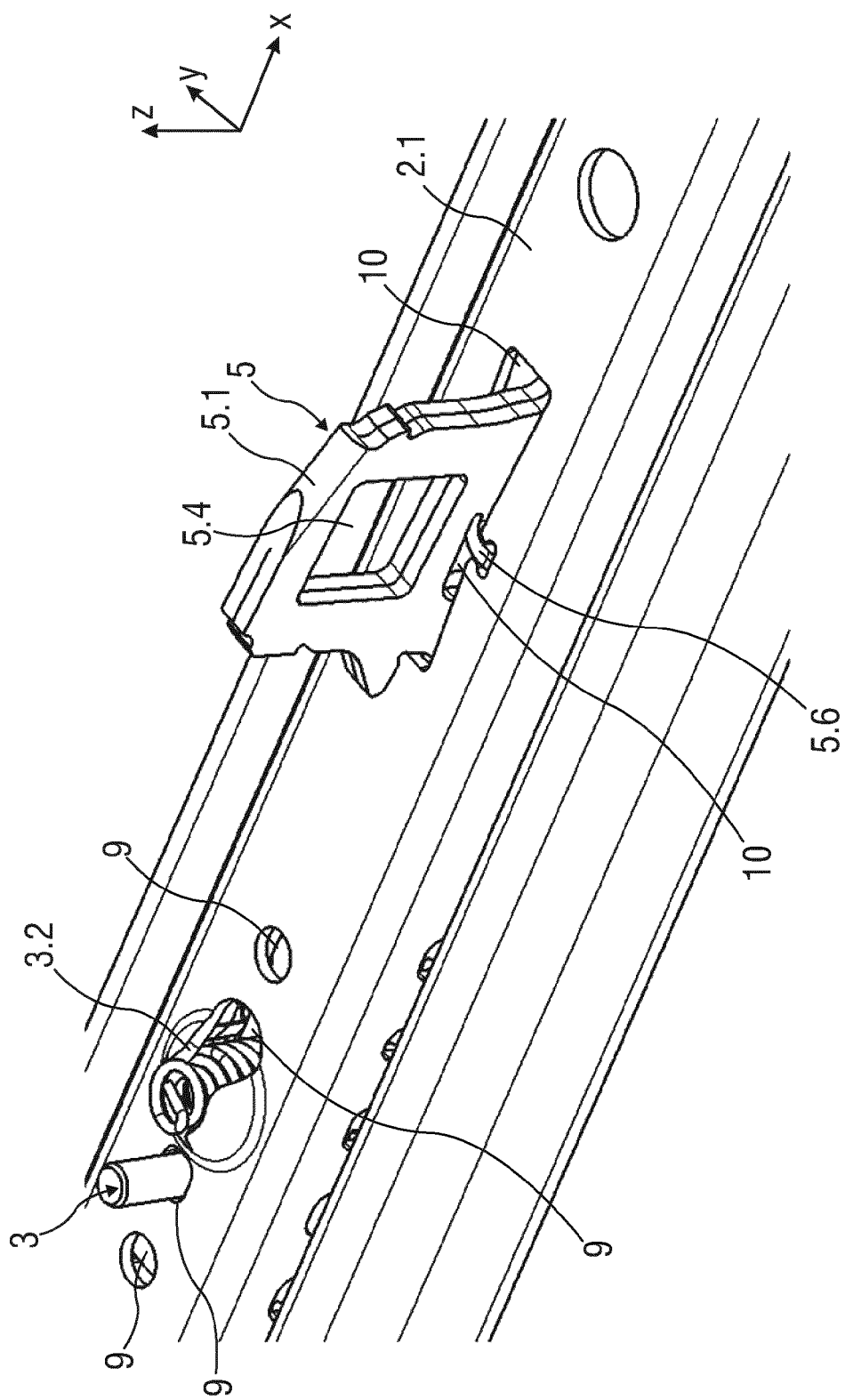
FIGS. 8A to 8C are schematic top view, perspective illustration and sectional illustration of a connection region of a release mechanism.
Figure 8B:
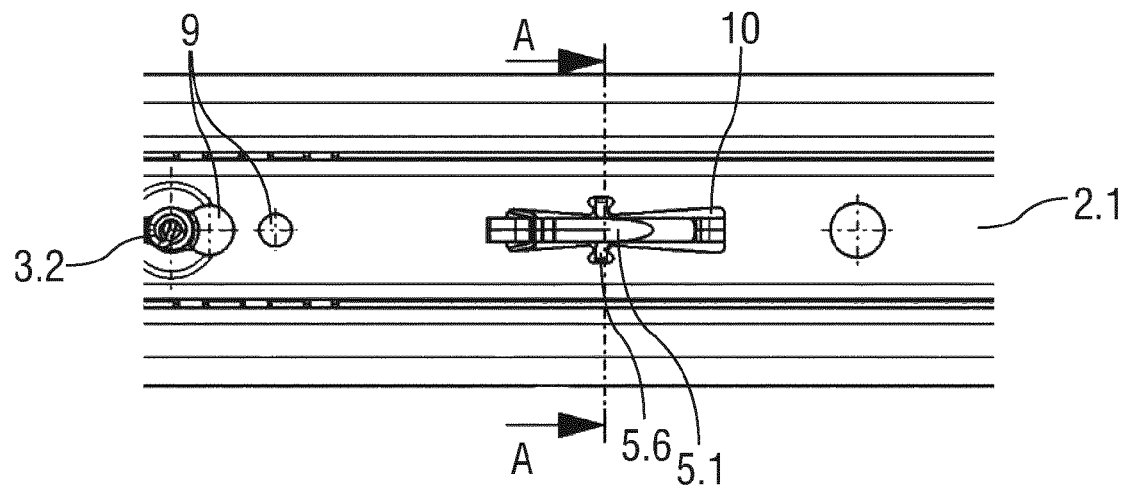
Figure 8C:
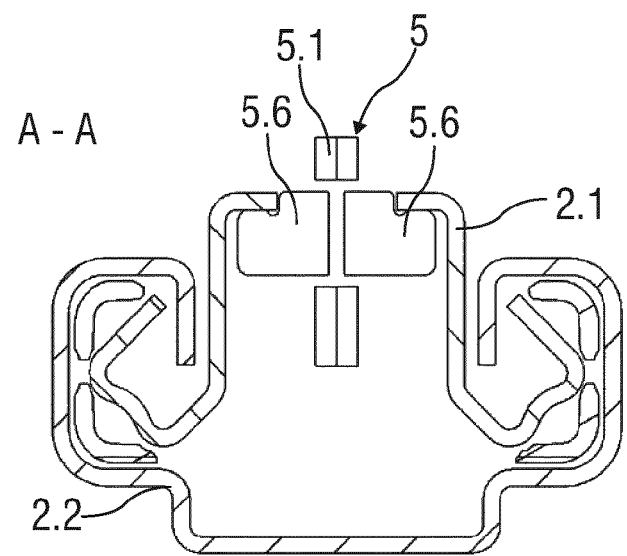

FIGS. 8A to 8C show schematically, in top view and in a perspective illustration, the connection region 5.1 which is guided through the slot opening 10 in the rail 2.1 and protrudes from the latter. To secure the release lever 5 against displacement in the longitudinal direction (X direction), the connection region 5.1 has two holding lugs 5.6 which protrude transversely with respect to the X direction and are arranged in corresponding formations 22, for example slots, in the rail 2.1. FIG. 8A illustrates by way of example a bulge with a passage opening 9 in the upper rail 2.1, in which the tension spring 3.2 is held.

Figure 9:
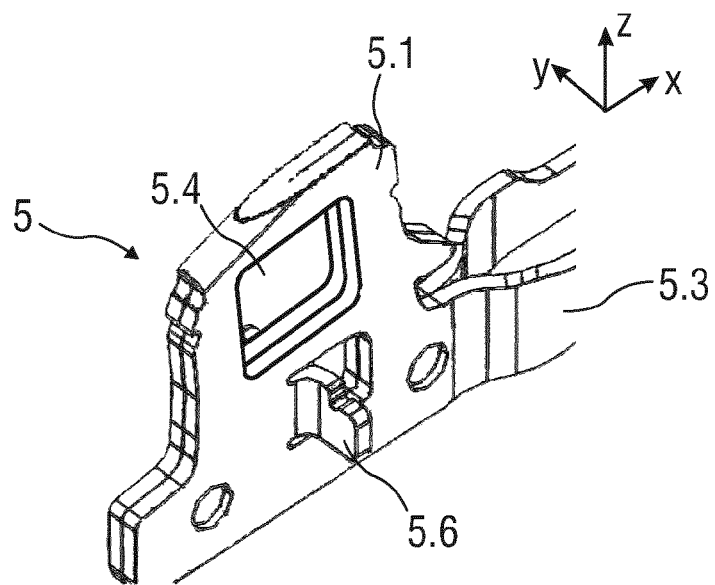
FIG. 9 is a schematic perspective illustration of a release lever.

FIG. 9 shows schematically, in a perspective illustration, an embodiment of the release lever 5. The internal part of the release lever 5 here is of fork-shaped design and has two protruding lever ends 5.3. The release lever 5 can be of single or two-part design. The release lever 5 can be formed from metal or plastic or configured as a hybrid shaped part.

Figure 10:
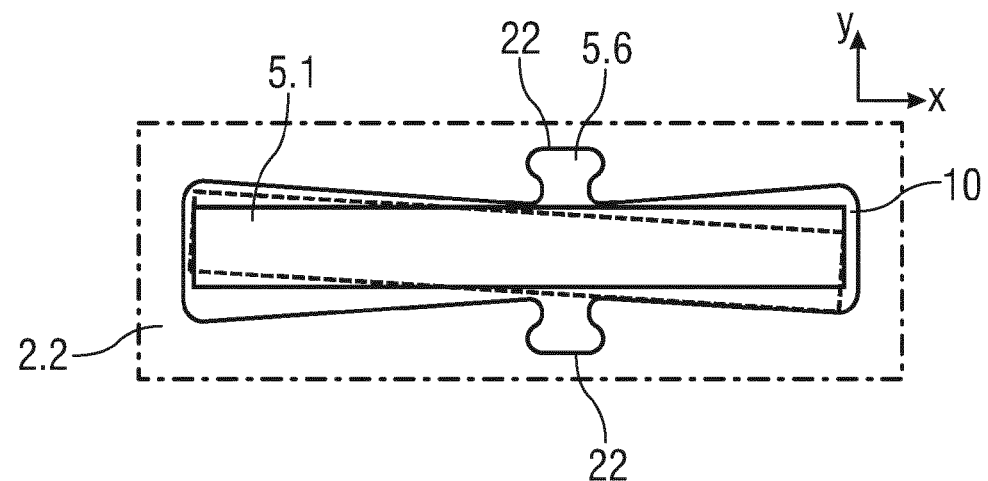
FIG. 10 is a schematic top view of a release lever arranged in an upper rail.

FIG. 10 schematically shows, in top view, the release lever 5 arranged in the slot opening 10 in the upper rail 2.1.

The slot opening 10 and the formations 22 are configured in such a manner that they support the release lever 5 in the X and Y direction. In particular, the slot opening 10 is configured in a manner expanded toward the respective end, that is to say, the slot opening 10 has an increasing width toward the ends thereof. Similarly, the formations 22 emerging from the slot opening 10 are of expanded design toward the outside.

Figure 11:
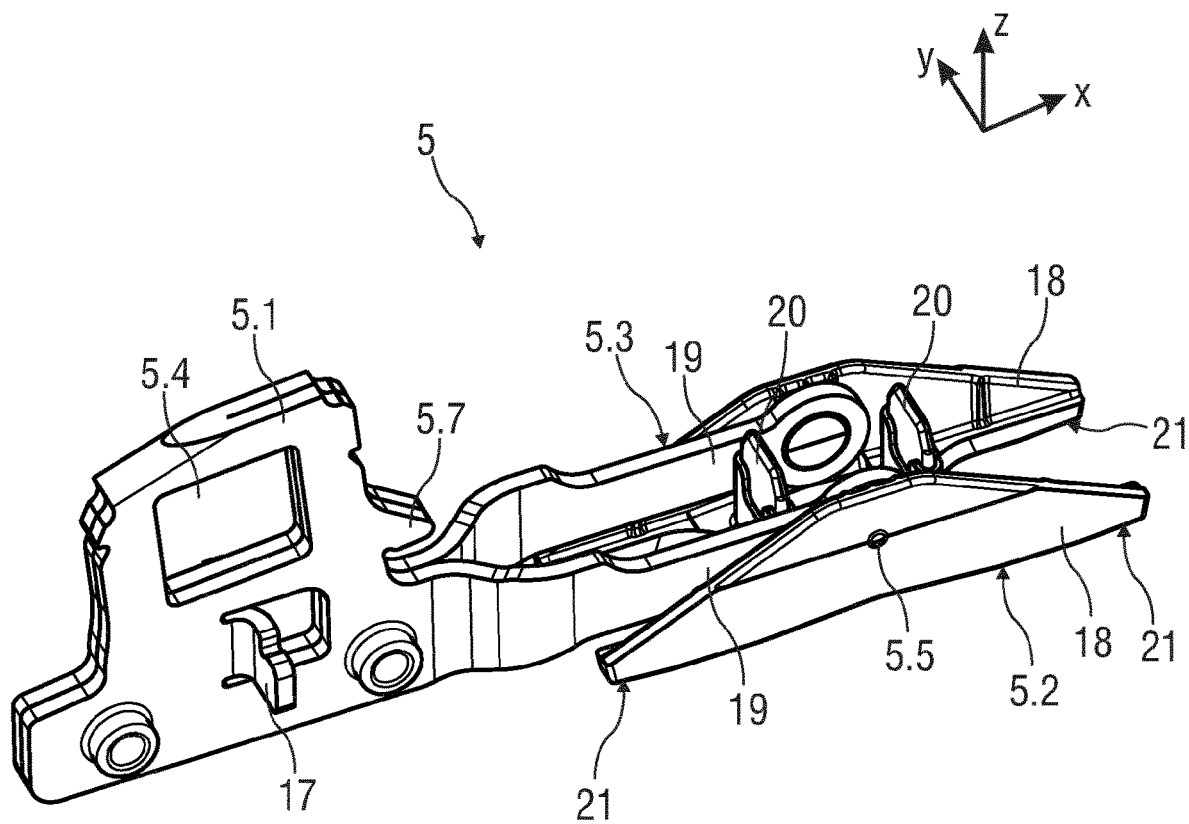
FIG. 11 is a schematic perspective illustration of a release lever with a positioning element for a rail lock.

FIG. 11 schematically shows, in a perspective illustration, the release lever 5 with the positioning element 5.2 for the rail lock 3. The positioning element 5.2 is held centrally on the lever end 5.3 by means of the hinge pin 5.5. In the exemplary embodiment, the positioning element 5.2 has two triangular positioning plates 18 which are each mounted in an articulated manner on a prong 19 of the fork-shaped lever end 5.3. The positioning plates 18 are each mounted in an articulated manner here on the release lever 5 as a rocker, that is to say as a two-armed lever.

In addition, two damping elements 20 are provided which hold the positioning element 5.2 and the release lever 5 in a manner free from rattling in the rest position in relation to the upper rail 2.1. The damping elements 20 are formed from a soft plastic.

The release lever 5 is formed from a harder material than the damping elements 20. The release lever 5 is formed in particular from a hard plastic or as a two-component structure, in particular as an injection molded part composed of metal encapsulated by plastic. The release lever 5 can be of single or multi-part design, in particular 2 or 3-part design.

The two outer triangle corners, in particular their lower surfaces 21 of the positioning plates 18, are each assigned to one of the locking elements 3.1 and act on or lie thereagainst and press same into the unlocking position EP when the actuating mechanism 4 is actuated.

In addition, the release lever 5 has a stop 5.7 as a stopper in the Z direction, in particular as an end stop of the rotation of the release lever 5, in particular in order to protect the plastics components against stress and misuse forces. The release lever 5 is prefixed to the upper rail 2.1 in the Z direction by means of the stop 5.7.

Figure 12:
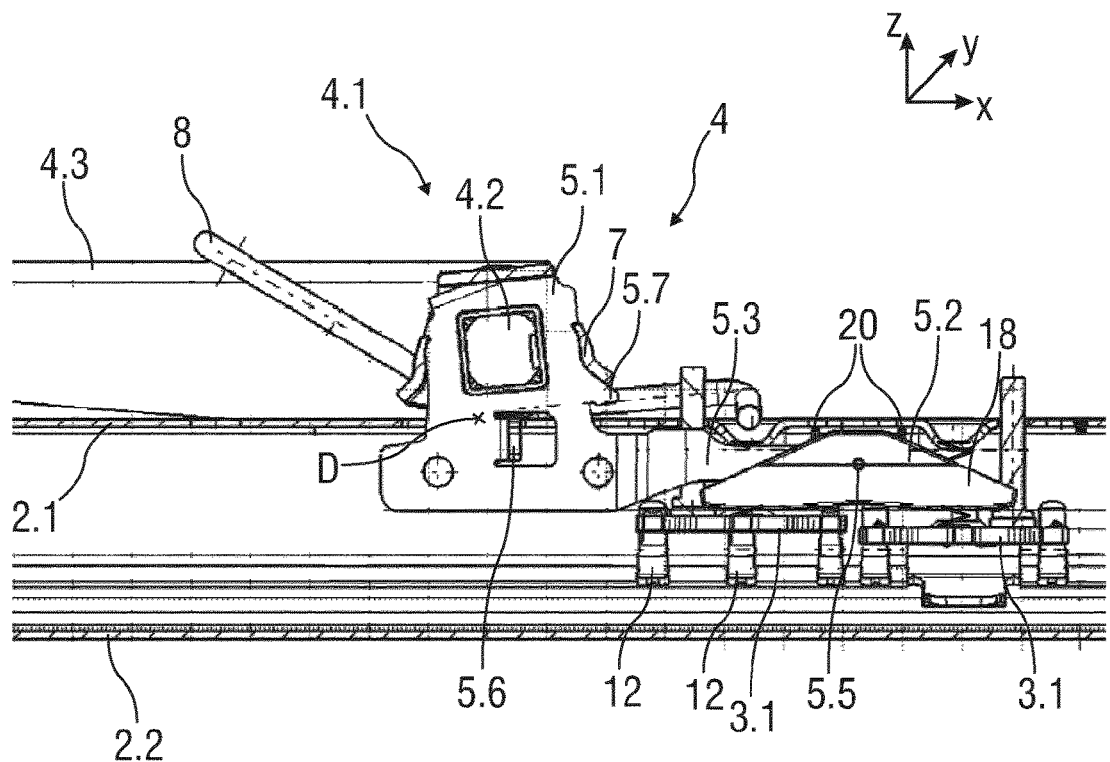
FIG. 12 is a schematic longitudinal sectional view of a longitudinal adjuster.
Figure 13A:
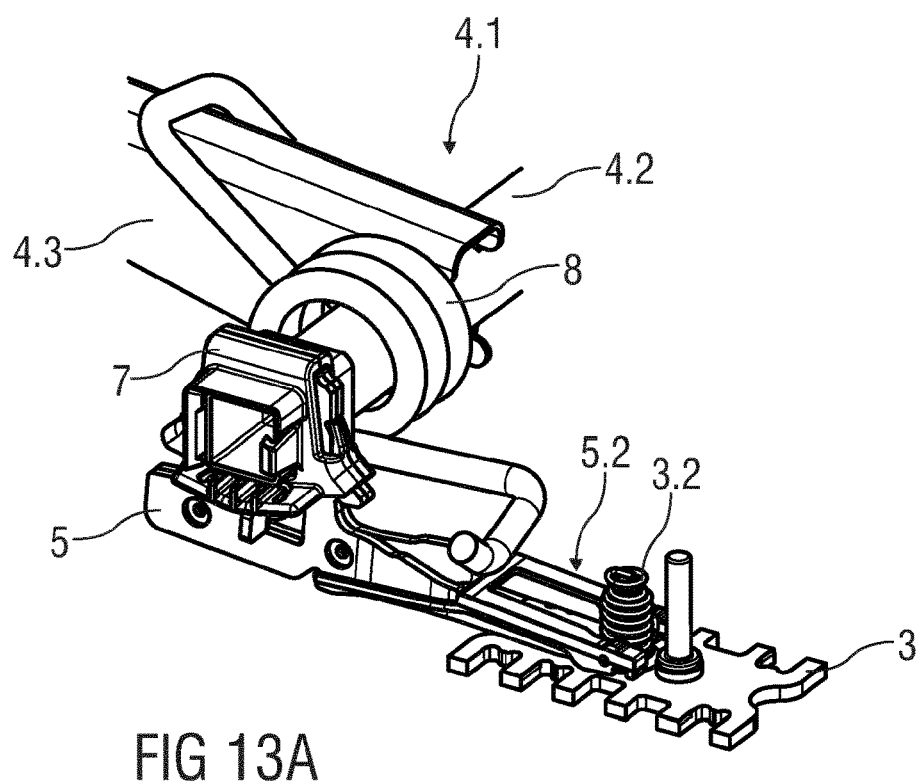
FIGS. 13A, 13B, 13C are schematic perspective illustrations and longitudinal sectional view of an actuating mechanism with a rail lock and an alternative positioning element for said rail lock.
Figure 13B:
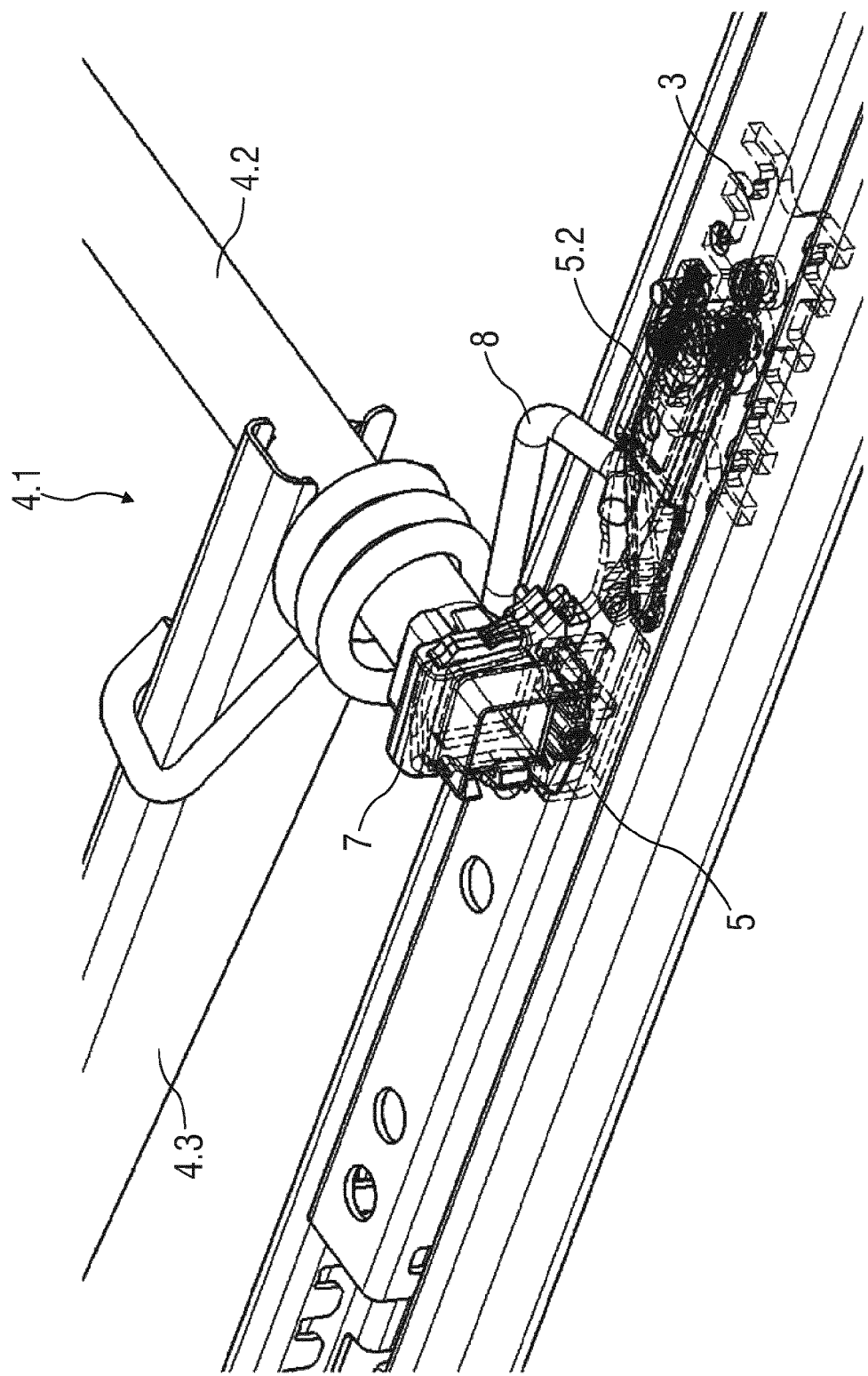
Figure 13C:
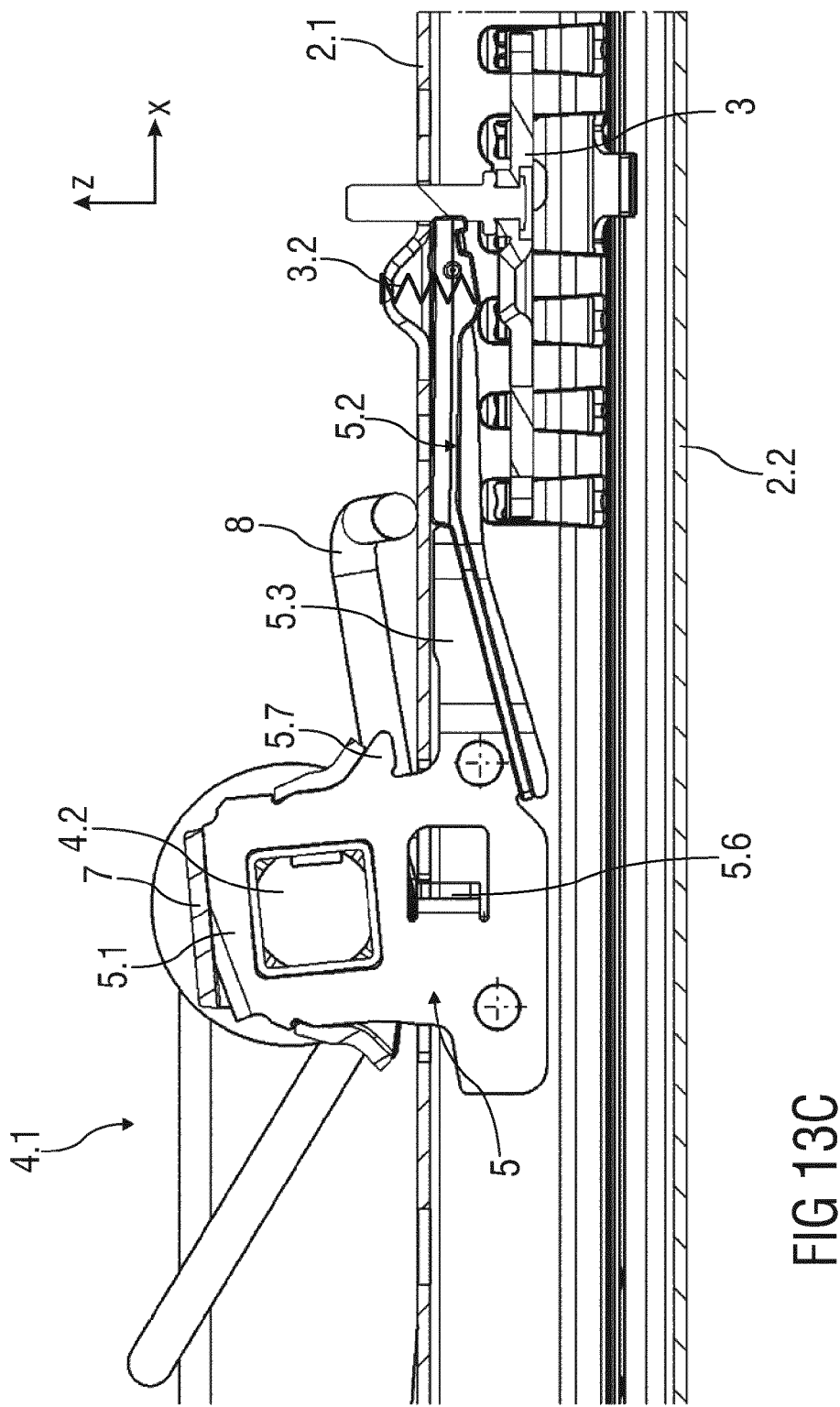

FIG. 12 schematically shows, in longitudinal section, the actuating mechanism 4 in the rest or starting position, in which the rail lock 3 locks the rails 2.1 and 2.2 to each other and the positioning element 5.2 strikes against the upper rail 2.1 by means of the damping elements 20, and the actuating arm 4.1 is held with spring pretensioning.

FIGS. 13A to 13C and 14 schematically show, in a perspective illustration, an alternative embodiment of a positioning element 5.2 and a rail lock 3.

The rail lock 3 comprises an individual plate-like locking element 3.1 with a tension spring 3.2 fastened thereto. Instead of an articulated mounting of the positioning element 5.2, the latter is fastened to the release lever 5, for example is directly clipped thereto or fastened thereto by means of an elastic band. Therefore, in this embodiment, there is no relative movement between the positioning element 5.2 and the release lever 5. In this embodiment, the positioning element 5.2 is formed from a soft plastics material and is configured to actuate various rail locks 3. For this purpose, the positioning element 5.2 is arranged at the lever end 5.3 and protrudes from the latter in the direction of the rail lock 3.

Figure 14:
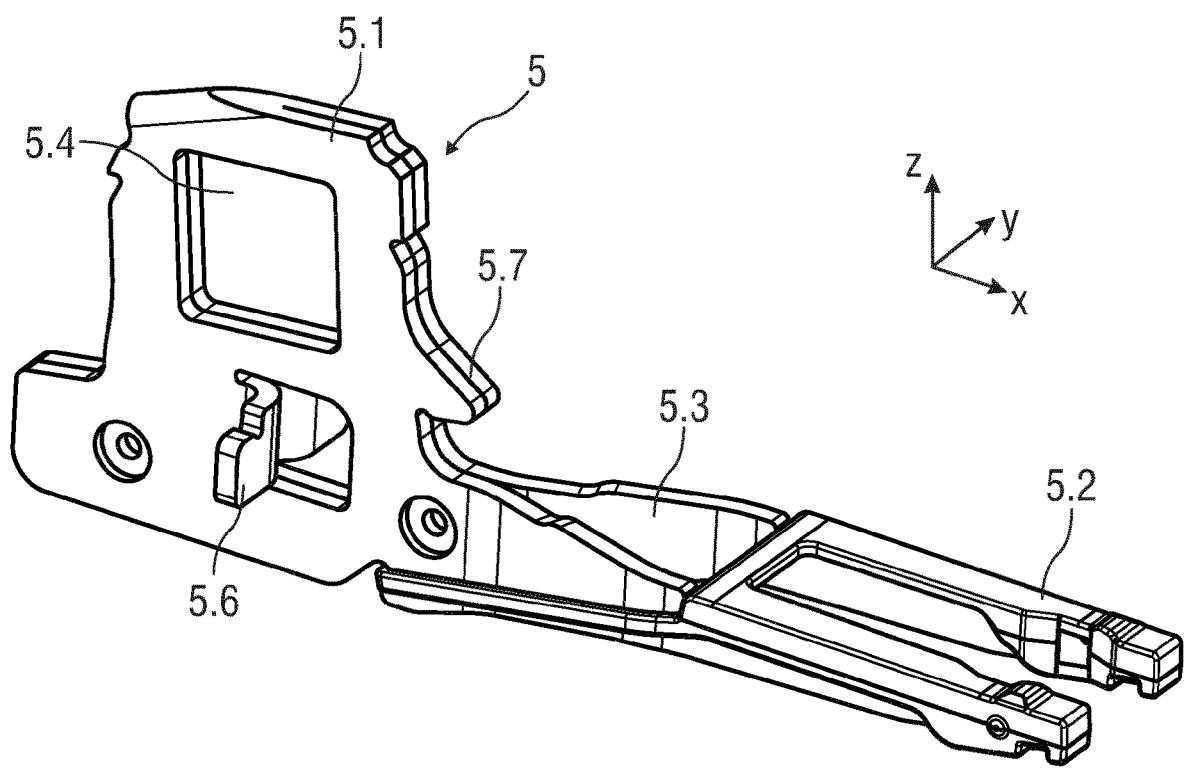
FIG. 14 is a schematic perspective illustration of a release lever with an alternative positioning element arranged thereon.

Analogously to the fork-shaped lever end 5.3 of the release lever 5, the alternative positioning element 5.2 is of fork-shaped design, as shown in FIG. 14.

The alternative positioning element 5.2 is formed from plastic and molded, for example, onto the release lever 5.

FIGS. 15A to 15H schematically show an actuating sequence during actuation of the actuating mechanism 4 for unlocking a rail lock 3. The mode of action of the rail lock 3 causes the one locking element 3.1 to be in a higher position than the other locking element 3.1. The locking element 3.1 in the higher position realizes the play-free position of the lock. The other locking element 3.1 is in a pre-locked or non-locked position and is therefore lower. In this exemplary embodiment, the tension springs 3.2 holding the locking elements 3.1 in their locking positions are held in curvatures in the upper rail 2.1.

Figure 15A:
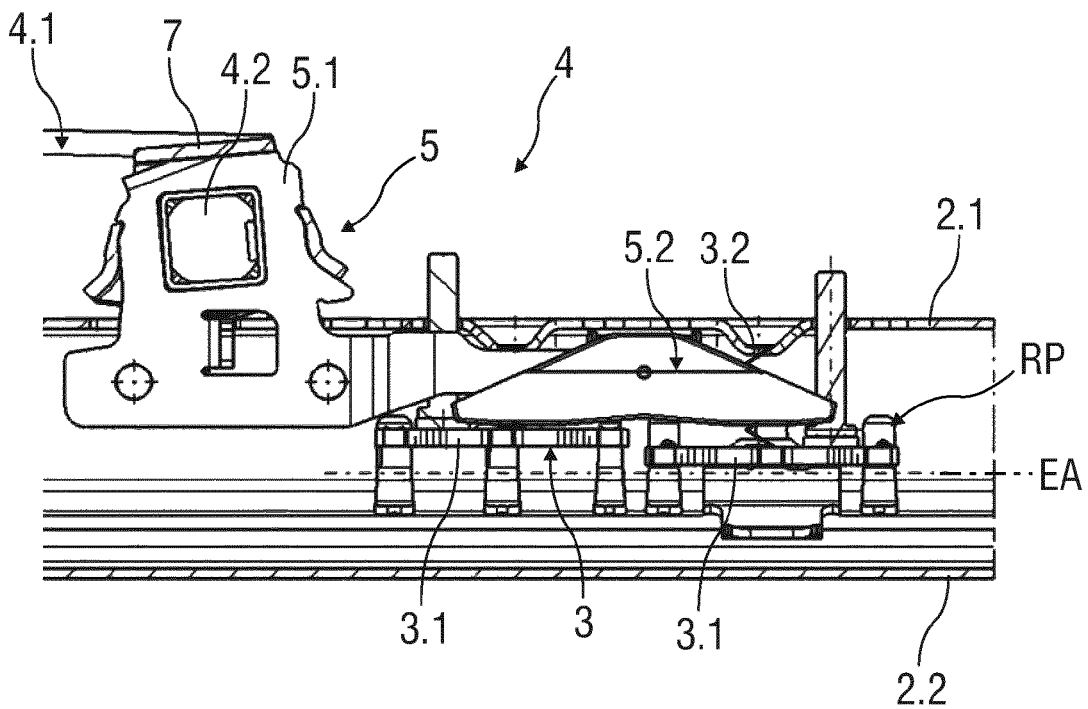
FIGS. 15A to 15H schematically show an actuating sequence during actuation of the actuating mechanism for unlocking a rail lock.

FIG. 15A shows the actuating mechanism 4 in a starting or rest position and therefore in a rest position RP in which the rail lock 3 locks the rails 2.1, 2.2 to each other at a maximum engagement depth. The engagement depth can vary due to tolerances. The respective release lever 5 is arranged horizontally relative to the rail system 2 at an angle of 0°.

Figure 15B:
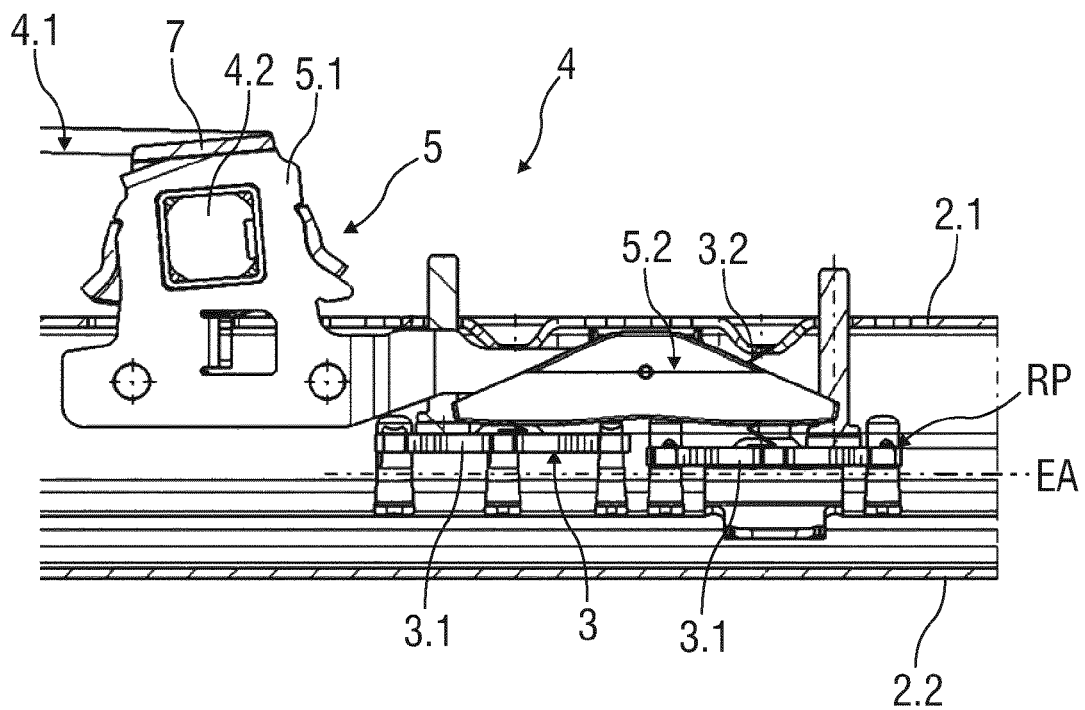

FIG. 15B shows the actuating mechanism 4 in what is referred to as a design position in which the actuating mechanism 4 is not actuated and the locking or latching plate which is in front in the direction of the connection region 5.1 is in the nominal region of the play-free position.

Figure 15C:
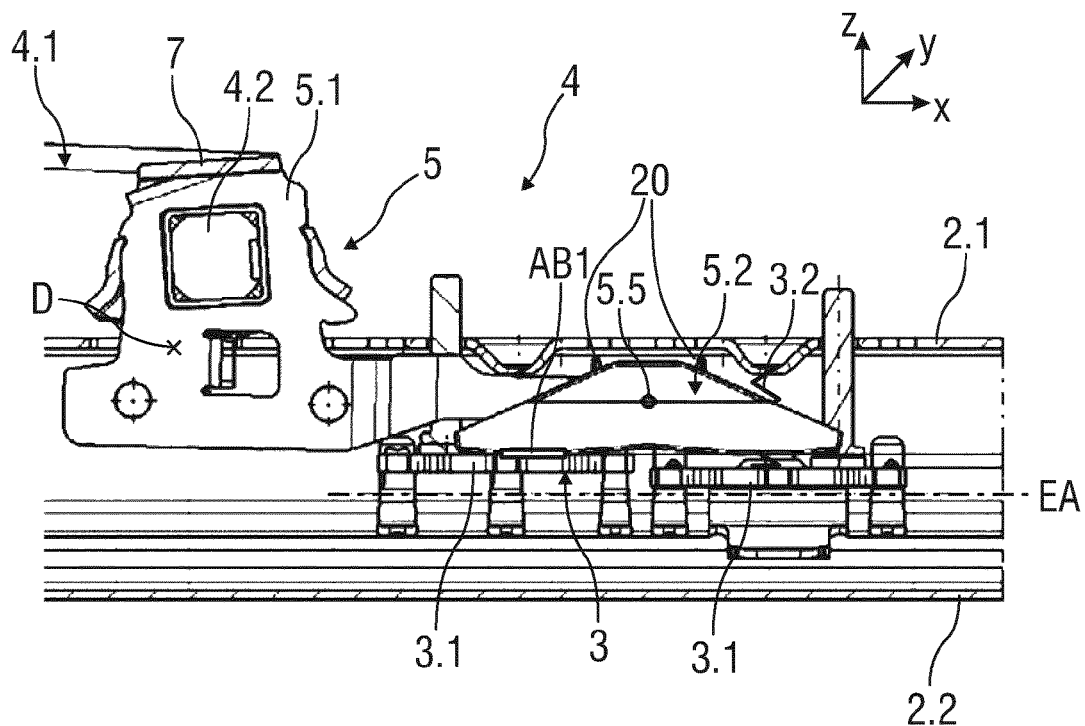

FIG. 15C shows the actuating mechanism 4 in what is referred to as an actuating position in which the actuating arm 4.1, in particular the hand grip 4.3, is actuated, in particular is pivoted upward in order to release the rail lock 3 and to permit a forward or rearward movement of the upper rail 2.1 and therefore of a seat.

The actuation of the hand grip 4.3 is transmitted here to the two release levers 5 by means of the transverse rod 4.2, and therefore the two rail pairs P1 and P2 can be unlocked.

During the pivoting of the hand grip 4.3 and, as a result, during the pivoting of the release lever 5 for example by an angle of greater than 0.5°, in particular within a range of 0.5° to 1.5°, the positioning element 5.2 comes at least to stop against one of the locking elements 3.1 in the stop region AB1.

Figure 15D:
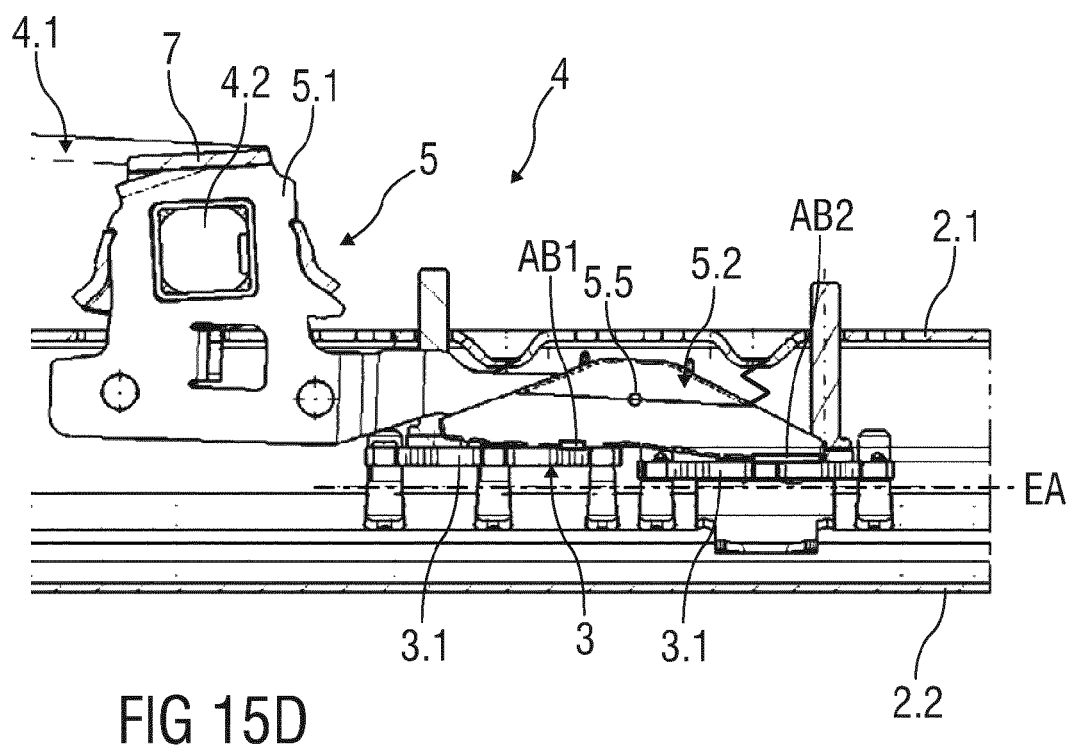

During further pivoting of the hand grip 4.3 and therefore of the release lever 5, for example by an angle of greater than 1.0°, in particular within a range of 1.0° to 2.0°, the positioning element 5.2, because of the pivotable mounting thereof on the release lever 5 and design thereof as a rocker, additionally stops against the further locking element 3.1 in the stop region AB2, as shown in FIG. 15D.

Figure 15E:
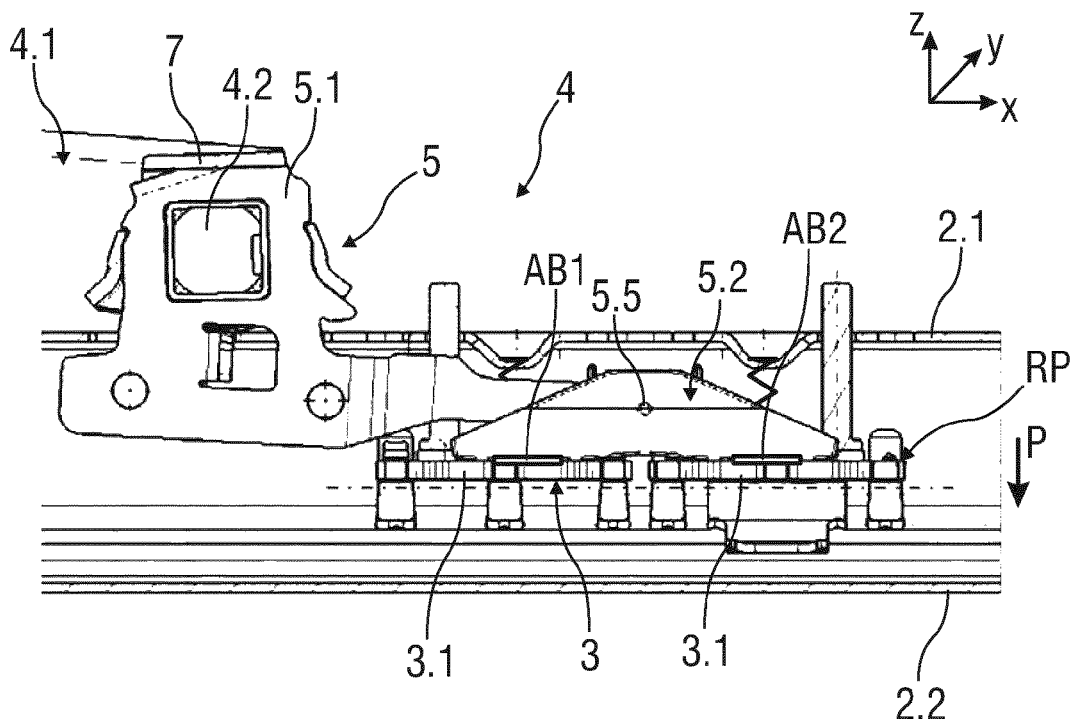

Further pivoting of the release lever 5 by an angle of greater than 2.0°, in particular of greater than 3.0°, for example within a range of 2.0° to 6.5°, causes the positioning element 5.2 to rest with both stop regions AB1 and AB2 on the two locking elements 3.1, and therefore the latter are pressed out of their rest position RP (=locked position) according to the arrow P, as FIG. 15E shows.

The contact or support surfaces 21 of the release lever 5, in particular of the positioning element 5.2, are of arched design. By this means, the lever arm is smaller with respect to the axis of rotation 5.5 in the higher locking element 3.1 and greater in the lower locking element 3.1. Furthermore, the portion of unlocking force on the higher locking element 3.1 in each case is greater. This produces self-centering of the two locking elements 3.1 in height. Synchronous unlocking can therefore be achieved.

Figure 15F:
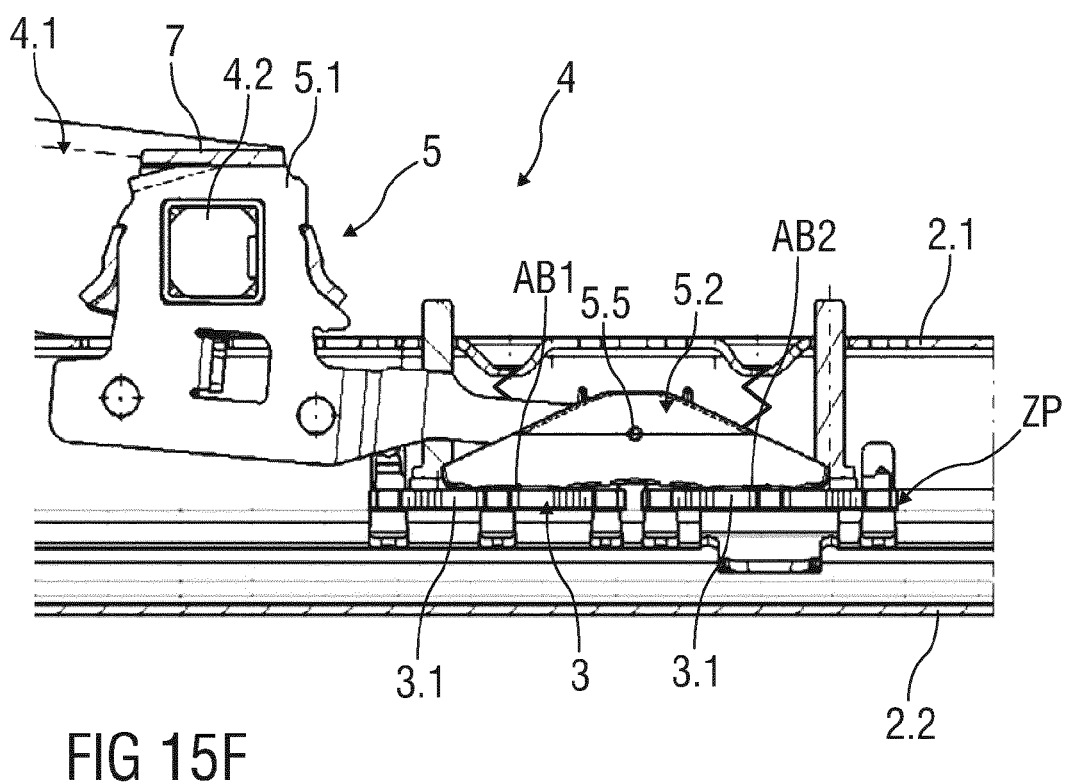
Figure 15G:
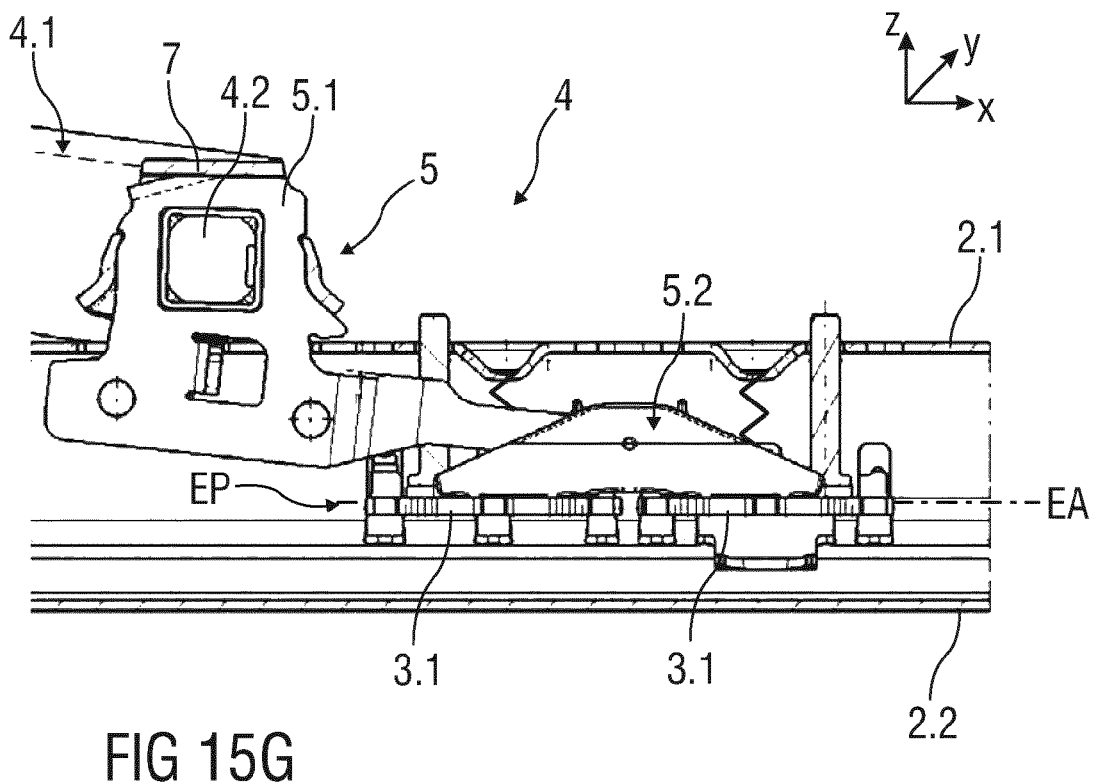
Figure 15H:
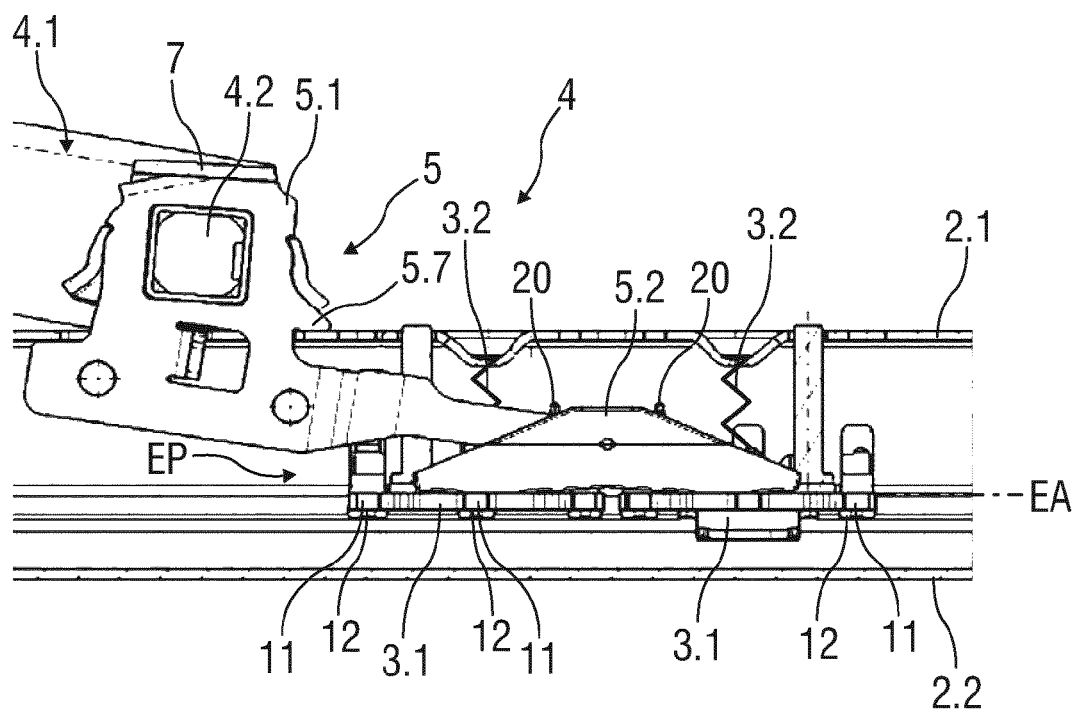

FIG. 15F shows the two locking elements 3.1 in an intermediate position ZP between the rest position RP (FIGS. 15A, 15B) and the unlocking position EP (FIGS. 15G, 15H).

FIG. 15G shows the two locking elements 3.1 in the preliminary unlocking position EP in which the release lever 5 is pivoted by an angle of greater than 6° and in which the rails 2.1, 2.2 are unlocked from each other.

FIG. 15H shows the two locking elements 3.1 in the final unlocking position EP in which the release lever 5 is pivoted by an angle of greater than 9° and in which the rails 2.1, 2.2 are unlocked from each other. The locking teeth 11 rest here on the locking openings 12. The final unlocking position EP is reached when the stop 5.7 configured as a stopper (actuating stopper) strikes on the upper rail 2.1 and therefore further actuation of the actuating arm 4.1 is prevented.

After release of the actuating arm 4.1, the spring element 8 which is configured as a restoring spring resets the actuating arm 4.1 and, with the latter, the release lever 5 and the positioning element 5.2 and, by means of the tension springs 3.2, the rail lock 3 into their starting and rest position RP. The restoring movement of the release lever 5 and of the positioning element 5.2 is damped here by means of the damping elements 20.

While specific embodiments of the invention have been shown and described in detail to illustrate the application of the principles of the invention, it will be understood that the invention may be embodied otherwise without departing from such principles.

The invention claimed is:

1. An actuating mechanism for a longitudinal adjuster of a vehicle seat, wherein the longitudinal adjuster comprises an upper rail and a lower rail, which rails are lockable to each other by means of at least one lock, and the actuating mechanism comprises:
   at least one actuating arm;
   a release lever;
   a positioning element arranged on the release lever and mounted pivotably at a free lever end of the release lever; and
   a connection region arranged on the release lever, with an opening for fastening the actuating arm in a rotationally fixed manner, wherein the free lever end is configured for arrangement in an inner space of the rails and the connection region is configured so as to be able to pass through an upper side of the upper rail, wherein the connection region comprises a connection region portion located outside of the inner space of the rails, the connection region portion being located at a spaced location from the upper rail.

2. The actuating mechanism as claimed in claim 1, wherein the lock comprises at least one locking element, and the positioning element has contact or support surfaces which are arched with respect to the at least one locking element.

3. The actuating mechanism as claimed in claim 1, wherein the positioning element is configured as a two-armed lever, disk-shaped rocker.

4. The actuating mechanism as claimed in claim 3, wherein the free lever end comprises a fork-shaped configuration with a plurality of fork ends, wherein one positioning element is provided per fork end.

5. The actuating mechanism as claimed in claim 4, wherein the plurality of positioning elements are configured as a component, shaped plastics part.

6. A longitudinal adjuster comprising:
   a rail profile comprising an upper rail and a lower rail;
   a rail lock for locking and unlocking the rails to each other;
   an actuating mechanism for actuating the rail lock, the actuating mechanism comprising:
   an actuating arm;
   a release lever;

a positioning element arranged on the release lever and mounted pivotably at a free lever end of the release lever; and a connection region arranged on the release lever, with an opening fastening the actuating arm in a rotationally fixed manner, wherein the free lever end is configured for arrangement in an inner space of the rails and the connection region is configured so as to be able to pass through an upper side of the upper rail, wherein the free lever end projects into an inner space of the rail profile, and the connection region is guided through an upper side of the upper rail, wherein the connection region comprises a connection region portion located outside of the inner space of the rails, the connection region portion being located at a spaced location from the upper rail.

7. The longitudinal adjuster as claimed in claim 6, wherein the positioning element is configured to center the rail lock with respect to an end position.

8. The longitudinal adjuster as claimed in claim 7, wherein the positioning element centers the rail lock with respect to an unlocking axis of an unlocking position.

9. The longitudinal adjuster as claimed in claim 6, wherein the rail lock comprises a plurality of locking elements, and the positioning element adjusts and positions the plurality of locking elements in at least one of their end positions into an unlocking plane.

10. The longitudinal adjuster as claimed in claim 9, wherein the positioning element acts on the locking elements in the inner space of the rail profile.

11. The longitudinal adjuster as claimed in claim 6, wherein the actuating mechanism comprises a transverse rod, the transverse rod comprising a transverse rod end connected to the connection region, the transverse rod end being maintained at a spaced location from the upper rail at a position above the upper rail via the connection region.

12. A longitudinal adjuster comprising:
a rail profile comprising an upper rail and a lower rail, the upper rail comprising an upper rail opening;
a rail lock for locking and unlocking the rails to each other;
an actuating mechanism for actuating the rail lock, the actuating mechanism comprising:
an actuating arm;
a release lever;
a positioning element arranged on the release lever and mounted pivotably at a free lever end of the release lever; and
a connection region arranged on the release lever, the connection region comprising a connection region opening, wherein the connection region opening receives at least a portion of the actuating arm such that the actuation is rotationally fixed to the connection region, the free lever end being arranged in an inner space of the rails and at least a portion of the connection region extending through the upper rail opening to a position located outside of the inner space.

13. The longitudinal adjuster as claimed in claim 12, wherein the positioning element is configured to center the rail lock with respect to an end position.

14. The longitudinal adjuster as claimed in claim 13, wherein the positioning element centers the rail lock with respect to an unlocking axis of an unlocking position.

15. The longitudinal adjuster as claimed in claim 12, wherein the rail lock comprises a plurality of locking elements, and the positioning element adjusts and positions the plurality of locking elements in at least one of their end positions into an unlocking plane.

16. The longitudinal adjuster as claimed in claim 15, wherein the positioning element acts on the locking elements in the inner space of the rail profile.

17. The longitudinal adjuster as claimed in claim 12, wherein the actuating mechanism comprises a transverse rod, the transverse rod comprising a transverse rod end connected to the connection region, the transverse rod end being maintained at a spaced location from the upper rail at a position above the upper rail via the connection region.

18. The longitudinal adjuster as claimed in claim 12, wherein the transverse rod end is in direct contact with the portion of the connection region.

19. The longitudinal adjuster as claimed in claim 12, wherein the portion of the connection region portion is located at a spaced location from the upper rail.

20. The longitudinal adjuster as claimed in claim 1, wherein the actuating mechanism comprises a transverse rod, the transverse rod comprising a transverse rod end connected to the connection region, the transverse rod end being maintained at a spaced location from the upper rail at a position above the upper rail via the connection region.

* * * * *